_United States Patent Office_     2,875,182
Patented Feb. 24, 1959

2,875,182

PRODUCTION OF POLYSULFIDE POLYMERS

Edward M. Fettes, Morrisville, Pa., and Eugene R. Bertozzi, Mercerville, N. J., assignors to Thiokol Chemical Corporation, Trenton, N. J., a corporation of Delaware No Drawing. Application March 9, 1955
Serial No. 493,307

13 Claims. (Cl. 260—79)

This invention relates to the manufacture of polysulfide polymers and more particularly to a novel method of making liquid polythiopolymercaptans.

Liquid polysulfide polymers capable of being cured to form rubber-like solids are known in the art and have been extensively used in recent years for a variety of commercial applications. Polysulfide polymers of this character are disclosed for example in Patrick Patent 2,466,963. Such polymers when properly prepared and cured possess numerous commercially important properties. Thus they are inert to oil, most solvents, water and mild acids and alkalis as well as to ozone and sunlight. They are tough and resilient and retain their flexibility at extremely low temperatures. Moreover, they are impermeable to gases and moisture and adhere tenaciously to such diverse materials as glass, metals, plastics, wood, leather and fabrics. Because of these valuable properties they have been extensively used as impregnating sealing, caulking and coating materials as well as for a variety of special uses such as gasoline hose, printer's rolls, potting compounds for electrical components, etc.

The utility of the polysulfide polymers is greatly enhanced by the fact that they can be prepared in the form of more or less viscous liquids capable of being cured at room temperature or elevated temperatures to rubber-like solids. Moreover, when properly prepared and cured, the liquid polymers can be converted to solid form with substantially no change in volume. Thus they may be used to impregnate finely porous materials, e. g. leather, and cured in situ to produce articles substantially impermeable to gases and liquids. Their dimensional stability upon curing coupled with their good electrical properties also makes these polymers especially useful for the encasing or "potting" of electrical components. More generally wherever irregular shaped rubber-like articles are desired they can be conveniently made by casting the liquid polymer in a suitable mold and curing it therein to produce the desired rubber-like article.

As pointed out in Patrick Patent 2,466,963, the liquid polymers may be combined with various materials that modify the properties of the cured polymer. Thus the liquid polymer can be mixed with various inert fillers such as for example ground cork, asbestos, cotton floc, wood flour, carbon black and the like. In cases where a relatively soft cured product is desired, any of various plasticizers are advantageously mixed with the liquid polymer prior to curing. Also various resinous and other polymeric materials are compatible with the liquid polymer to produce cured products having modified properties. Some of these resinous materials, notably the phenolformaldehyde and epoxy resins, combine chemically with the polysulfide polymers to produce useful copolymers.

As disclosed in Patrick Patent 2,466,963 and in other Patrick patents referred to below the polysulfide polymers are characterized by the fact that they have recurring disulfide (SS) linkages and that their basic structural unit or building block is represented by the formula SRS wherein R is an organic radical having at least two sulfur-connected valences. The SRS groups form linear polymeric chains and the chains are provided at their ends with functional groups which are reactive in various ways, depending upon the nature of the functional group, to effect a curing of the polymer. The physical state of the polymer depends chiefly upon its molecular weight and the liquid polymers usually have molecular weights falling within the range 1000 to 50,000.

While it is possible to make a liquid polymer composed substantially wholly of linear polymeric chains and cure it to a solid rubbery material, the product thus produced possesses properties that are undesirable for most applications. Thus the cured linear polymers are susceptible to "cold flow," that is, they undergo permanent deformation when subjected to pressure at atmospheric temperatures. Also they lack resilience and strength. In order to achieve a product having the desired strength, resilience and freedom from cold flow it is desirable to introduce a moderate amount of cross-linking into the polymer. Cross-linking is effected by utilizing organic radicals which are connected to sulfur atoms of more than two of the disulfide linkages, that is to say, $RS_3$ units and $RS_4$ units are interposed at intervals in polymeric chains that are essentially composed of SRS units.

A very large number of organic radicals R can be used in the preparation of the polysulfide polymers. Numerous examples of useful radicals are given in Patrick Patents 2,142,144; 2,142,145; 2,195,380; 2,306,643; 2,216,044; 2,221,650; 2,235,621; 2,278,127; 2,363,114 and 2,363,615. However, while a large number of different types of organic radicals can be used in the preparation of the polysulfide polymers, the radicals that are at present of primary commercial interest fall in a somewhat more limited group and for the most part are saturated aliphatic hydrocarbon or oxahydrocarbon radicals. Specific examples of useful organic radicals within this group are given hereinafter.

Prior to the present invention, most of the commercial liquid polysulfide polymers have been made by the "splitting" method disclosed in Patrick 2,466,963. In accordance with a typical embodiment of this method an organic halide or mixture of halides, quite commonly a mixture containing a major proportion of dihalide and minor proportion of tri-halide, is reacted with an alkaline polysulfide to form a high molecular weight solid polymer and is then split with a suitable splitting agent e. g. sodium hydrosulfide, and a sulfur acceptor e. g. sodium sulfite, to produce a material of lower molecular weight. When the splitting reaction is properly carried out as disclosed in Patent 2,466,963, a liquid polymer having mercaptan terminals is produced that can be effectively cured to produce a rubbery solid having the desired characteristics. However, it is apparent that this method involves a rather round-about route for obtaining a liquid polymer from low molecular weight raw materials and that it would be desirable to have a simpler, more direct method of preparing the liquid polymer.

It is accordingly an object of the present invention to provide a relatively simple and effective method of making liquid polysulfide polymers. It is another object of the invention to provide a method of making polysulfide polymers with improved yield by both decreasing losses due to the formation of soluble mercaptides and reducing the formation of undesirable by-products. It is still another object of the invention to provide a direct method of making liquid polysulfide polymers from relatively inexpensive raw materials. It is a still further object of the invention to provide a method of making polysulfide polymers that permits a high degree of control over the molecular weight of the product. Other objects of the invention will be in part obvious and in part pointed out hereafter.

The objects of the present invention are achieved in general by reacting one or more organic halides with an aqueous inorganic thiosulfate solution to form an organic thiosulfate and thereafter treating the organic thiosulfate solution with a mixture of a water-soluble hydrosulfide and sulfide to produce the desired polymer. The initial reaction between the organic halide and the thiosulfate may be represented by the following equation:

(1) $RX_n + nNa_2S_2O_3 \rightarrow R(S_2O_3Na)_n + nNaX$

In this equation $n$ has a value of 2 to 4, X is halogen and R as indicated above may be any of a large variety of organic groups, but for economic reasons is usually selected from the group consisting of aliphatic hydrocarbons and oxahydrocarbon radicals. It is usually desirable that $RX_n$ be composed primarily of $RX_2$ compounds with relatively small proportions of $RX_3$ and/or $RX_4$ compounds being included to provide the desired cross-linking in the finished polymer as described above. It will of course be understood that other water-soluble metal thiosulfates can be substituted for the sodium thiosulfate specifically referred to in the above equation.

In the second step of the process one or more organic thiosulfates prepared in the manner indicated in Equation 1 are reacted with, for example, an alkali metal monosulfide and an alkali metal hydrosulfide in accordance with the following equation:

(2)
$zR'(S_2O_3Na)_2 + yR''(S_2O_3Na)_m +$
$z-1+y)Na_2S + (2+(m-2)y)NaSH \rightarrow$
$H_{2+(m-2)y}(SR'-S)_z(R''S_m)_y + (z-1+y)Na_2SO_3 +$
$(z+1-y(1-m))Na_2S_2O_3$ In this equation $m$ is 3 or 4, $y$ may vary from 0 to 10, $z$ may vary from 2 to 500 and R' and R'' are selected from the group consisting of aliphatic hydrocarbon and oxahydrocarbon radicals, R' having two sulfur-connected valences and R'' having $m$ sulfur-connected valences. Thus the expression SR'S represents the divalent units of which the polymeric chains are essentially composed and the expression $R''S_m$ represents the units that provide cross-linking between the polymeric chains.

In the foregoing equation sodium monosulfide and hydrosulfide are illustrative of the reagents that may be used. Water-soluble hydrosulfides and sulfides of other metals can be substituted for the sodium salts of the equation. Also as indicated in the specific examples given hereafter, sulfides of higher rank than the monosulfide e. g. sulfides having a rank of 1 to 6, may be used.

It has been found that the ratio of hydrosulfide to sulfide used in treating the organic thiosulfate plays an important part in determining the properties of the finished polymer. In general this ratio may vary from 0.002 to 2.0 moles of hydrosulfide per mole of sulfide. At the upper end of this range where the hydrosulfide-sulfide ratio is 2.0, relatively low molecular weight polymers are produced which are quite fluid; and as this ratio is reduced the molecular weight and viscosity of the polymer increase. At the lower end of this range where the ratio is about 0.002, the molecules of the polymer contain on the average about 500 SR'S groups (the value of $z$ is about 500) and the polymer is a rather soft solid. It will be recalled that $R''S_m$ units constitute a minor proportion of the polymer and hence it is the number of SR'S units in the molecule that largely determine its molecular weight and consistency. In polymers of this type the viscosity of the polymer increases with a decreasing ratio of hydrosulfide to sulfide and it is not possible to determine definitely the dividing line between the liquid and solid state. However, in general the polymers prepared by using a ratio of 0.05 to 2.0 are liquids and the molecules of such polymers contain from 2 to 40 SR'S units. It will of course be understood that the molecular weight of the polymer is a function of the nature of the radical R' in the sense that if a radical R' of larger molecular weight is used, the number of SR'S units required to produce a given molecular weight polymer decreases. Hence the ranges given above should be considered approximate.

As has been pointed out above a wide variety of organic radicals can be used in preparing the present polymers but the radicals that are of primary commercial interest at the present are the aliphatic hydrocarbon and oxahydrocarbon radicals. Examples of organic halides that can be used in the present process to provide radicals of this type are given in Table I below:

TABLE I

*Haloethers*

$XC_2H_4OC_2H_4X$ $XC_2H_4OC_2H_4OC_2H_4X$

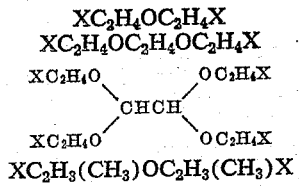

$XC_2H_3(CH_3)OC_2H_3(CH_3)X$

*Haloformals*

$XC_2H_4OCH_2OC_2H_4X$ $XC_2H_4OCH_2OC_2H_4OCH_2OC_2H_4X$

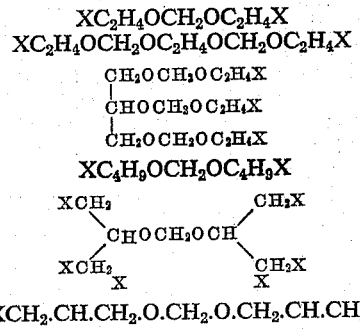

$XC_4H_8OCH_2OC_4H_9X$

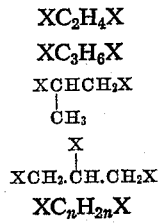

$XCH_2.CH.CH_2.O.CH_2.O.CH_2.CH.CH_2X$

*Halohydrocarbons*

$XC_2H_4X$ $XC_3H_6X$ $XCHCH_2X$
$|$
$CH_3$ $X$
$|$
$XCH_2.CH.CH_2X$ $XC_nH_{2n}X$ wherein $n$ varies from 3 to about 10.

In order to point out more fully the nature of the present invention the following specific examples are given of illustrative embodiments of the present process.

EXAMPLE 1

A 12-liter flask was charged with 7600 ml. of water, 4960 gms. (20 mols) of $Na_2S_2O_3.5H_2O$ and 34 gms. (0.32 mol) of $Na_2CO_3$. The mixture was heated with agitation to 200° F., then 1144 gms. (8.0 mols) dichloroethyl ether was added and heating was continued at 200° F. with agitation for 3 hours to produce a dithiosulfate of ethyl ether. Titration of unreacted thiosulfate at the end of this period indicated a 96% conversion of the chloroether to the thiosulfate.

This solution was treated with a mixture of sodium monosulfide and sodium hydrosulfide in the following manner: A 5-liter flask was charged with 700 ml. $H_2O$, 208 gms. of flake sodium monosulfide containing 60% by weight (1.6 mols) $Na_2S$, and 64 gms. of flake sodium hydrosulfide containing 70% by weight (0.80 mol) NaSH. The mixture was heated to 180° F. with agitation. Thereafter 2875 ml. of the organic thiosulfate solution as prepared above and containing about 2.0 mols of the organic thiosulfate was run into the mixed sulfide solution at a uniform rate over a period of an hour. The reaction mixture was agitated at a temperature of about 180° F. during addition of the thiosulfate and for another hour after the addition of the organic thiosulfate was complete. A liquid polysulfide polymer formed during the reaction period and settled to the bottom of the reaction flask.

The aqueous phase in the reaction flask was separated by decantation and the liquid polymer was washed three times by decantation for about 5 minutes with fresh hot water at a temperature of 140° to 160° F. Separation of the wash water was effected by permitting the polymer to settle and decanting the water. The polymer was then oven-dried overnight at 180° to 200° F. and filtered. A yield of 184 gms., 68% of the theoretical yield, was obtained. The viscosity of the product polymer was 21 poises.

The liquid polymer was cured in the following manner: 100 grams of the liquid polymer was mixed on a paint mill with 50 gms. of titanium dioxide (titanox T102), 7 gms. of p-quinone dioxine (GMF), 3 gms. diphenylguanidine and 0.2 gm. of sulphur. The mixture was caused to make three passes through the paint mill, then placed in an oven for 16 hours at 158° F. The cured sample was molded into sheets in a press at 250° F. for ten minutes. The physical properties of the resulting sheets as determined on a Scott tester and Shore durometer were as follows:

Ultimate tensile strength_____p. s. i__ 200
Maximum elongation _____percent__ 900
Shore A durometer hardness_____ 28

EXAMPLE 2

A cross-linked polymer was made by copolymerizing thiosulfates derived from dichloroethyl ether and from trichloropropane. To prepare the ethyl ether thiosulfate a reactor was charged with 31 gallons of water, 167.7 lbs. $Na_2S_2O_3.5H_2O$, 38.9 lbs. of dichloroethyl ether and 450 gms. of sodium carbonate. The resulting mixture was heated to and maintained at 200° F. for a period of 5 hours to produce the ethylether dithiosulfate. Titration of unreacted thiosulfate at the end of the reaction period showed 95.2% conversion of the dichloroethyl ether to the organic thiosulfate.

To prepare the propane-1,2,3-tris-thiosulfate a second reactor was charged with 750 ml. water, 465 gms. (1.875 mols) of $Na_2S_2O_3.5H_2O$, 4 gms. (0.04 mol) of sodium carbonate and 250 gms. of the methyl ether of diethylene glycol. This mixture was heated to 200° F. with agitation and 74 gms. (0.50 mol) of 1,2,3-trichloropropane was rapidly added thereto with agitation. Heating of the mixture was continued at reflux temperature (216° to 222° F.) with agitation for 7 hours. The course of the reaction was followed by titration of unreacted thiosulfate with iodine. The conversion rose gradually to 86% at the end of the 7-hour period, by which time the pH had dropped to about 5 and the reaction was considered complete.

The solutions containing the thiosulfate derived from dichloroethyl ether and the thiosulfate derived from trichloropropane respectively were then mixed and the organic thiosulfates were copolymerized. A flask was charged with 700 ml. of water, 708 gms. of flake sodium sulfide containing 60% (1.6 mols) of $Na_2S$, and 64 gms. of flake sodium hydrosulfide containing 70% (0.8 mol) of NaSH. The resulting solution was heated to and maintained at 180° F. with agitation. 2810 ml. of the ethyl ether thiosulfate solution containing 1.96 mols on an ether basis was mixed with 122 ml. (0.04 mol on a trichloropropane basis) of the organic thiosulfate derived from trichloropropane, and the resulting mixture was fed to the mixed sulfide solution according to the procedure of Example 1 to form a liquid polysulfide polymer that was cross-linked.

This polymer was compounded, cured and tested according to the procedure of Example 1 and gave the following results.

Ultimate tensile strength_____p. s. i__ 250
Maximum elongation _____percent__ 280
Shore A durometer hardness_____ 44

EXAMPLE 3

The procedure of Example 2 was followed except that the solution of organic thiosulfates derived from dichloroethyl ether and trichloropropane were mixed in such proportions that the resulting mixture contained 1.99 mols of the diethyl ether thiosulfate and 0.01 mol of the propane 1,2,3-tris-thiosulfate. The resulting polysulfide polymer was compounded, cured and tested as described in Example 1 with the following results:

Ultimate tensile strength_____p. s. i__ 320
Maximum elongation _____percent__ 620
Shore A durometer hardness_____ 37

EXAMPLE 4

A thiosulfate derived from tetrachloropropylformal was prepared as follows: A flask was charged with 1,000 ml. water, 620 gms. (2.5 mols) of $Na_2S_2O_3.5H_2O$, 5.3 gms. (0.05 mol) of sodium carbonate and 500 gms. of the methyl ether of diethylene glycol. This solution was heated to maintain it at 200° F. with agitation, and 135 gms. (0.30 mol) of tetrachloropropylformal was added thereto. Heating and agitation of the reaction mixture were continued for about 14 hours at 222° F. At the end of this period iodine tritration of the unreacted thiosulfate showed that 78.6% conversion of the tetrachloropropylformal to the organic thiosulfate had occurred.

295 ml. (0.08 mol) of this organic thiosulfate solution were mixed with 2680 ml. (1.92 mols) of a solution of an organic thiosulfate derived from dichloroethyl ether prepared as described in Example 1. This mixture was polymerized, compounded, cured and tested according to the procedure of Example 2 and gave the following results.

Ultimate tensile strength_____p. s. i__ 175
Maximum elongation _____percent__ 60
Shore A durometer hardness_____ 64

EXAMPLE 5

A copolymer of thiosulfates derived from dichloroethyl ether and trichloropropane was prepared essentially in accordance with the procedure of Example 2 except that 1.92 mols of the ethyl ether thiosulfate were used in place of 1.96 mols of Example 2 and 0.08 mol of the thiosulfate derived from trichloropropane were used instead of the 0.04 mol of Example 2. The resulting polymer was compounded, cured and tested according to the procedure of Example 1 except that sulfur was omitted in the cure. The results obtained were as follows:

Ultimate tensile strength_____p. s. i__ 300
Maximum elongation _____percent__ 150
Shore A durometer hardness_____ 55

EXAMPLE 6

A solution was made by dissolving 1240 gms. (5 mols) of $Na_2S_2O_3 5H_2O$ and 8.5 gms. (0.008 mol) of sodium carbonate in two liters of water. To the agitated solution at 200° F. was added 346 gms. (2.0 mols) of dichloroethyl formal. After agitation for 3 hours at 200° F. the residual sodium thiosulfate content of the solution was determined by tritration of a sample with a standard iodine. Thereafter samples were taken hourly and tested. After 5 hours' reaction time the titration showed the reaction had reached 98.6% of completion and heat and agitation were discontinued.

A polymerizing solution was made by dissolving sodium monosulfide and sodium hydrosulfide in water. 1250 cc. of this solution containing 241 gms. (1.85 mols)

of $Na_2S$ and 0.30 mol of NaSH was heated to 180° F. and the solution of thiosulfate derived from dichloroethylformal as prepared above was added thereto with agitation over a period of about one hour. Thereafter the reaction mixture was heated for an additional hour at 180° F. with agitation, after which the mixture was allowed to settle. The supernatant solution was decanted from the liquid polymer and the polymer was washed by mixing with water at 140° F. settling and decanting. The polymer was considered clean when 100 ml. of the wash water did not de-colorize 10 ml. of 0.1 N iodine solution. The washed polymer was dried by heating at 200° F. for 15 hours. The weight of dried polymer was 297 gms. which corresponds to a yield of about 90%. The Brookfield viscosity of the polymer at 80° F. was 365 poises.

A sample of this polymer was cured by a conventional lead peroxide and after curing exhibited a Shore A durometer hardness of 28.

EXAMPLE 7

In order to illustrate the control of viscosity that can be achieved with the present process a number of samples of polymer were prepared from dichloroethyl ether essentially in accordance with the procedure of Example 1 except that the ratio of sodium monosulfide to sodium hydrosulfide was varied to give liquid polymers having varying viscosities. The results obtained are listed in Table II.

TABLE II

| Mols $Na_2S$ per Mol Ether | Mols NaSH per Mol Ether | Viscosity |
|---|---|---|
| 0.8 | 0.4 | 16 poises. |
| 0.9 | 0.2 | 55 poises. |
| 0.95 | 0.1 | 195 poises. |
| 0.975 | 0.05 | 660 poises. |
| 1.0 | 0.05 | Putty-like. |

EXAMPLE 8

A 5-liter flask was charged with 1.12 gram mols of an approximately 2.3 molar solution of $Na_2S_{1.40}$ and 0.96 gram mols of NaSH (flake, 70%). The reaction mixture was heated to 180° F. with agitation. Thereafter 2.0 gram mols of aqueous organic thiosulfate prepared essentially in accordance with the procedure of Example 1 was added to the reaction mixture over a period of one hour. Heating at 180° F. and agitation were continued for a further period of one hour, and the aqueous liquor was separated from the liquid polymer by decantation. The polymer was washed twice by filling the flask with hot water, agitating and settling. The polymer was oven-dried at 180–200° F., weighed, filtered and its viscosity determined. The unfiltered weight was 175.5 grams or 65% of theory. The Brookfield viscosity at 80° F. was 65.2 poises. A sample of the polymer was cured 40 hours at 70° C. in the following formulation:

| | Parts |
|---|---|
| Liquid polymer | 100 |
| Titanox (titanium dioxide) | 50 |
| Paraquinone dioxime | 7 |
| Diphenyl guanidine | 3 |
| Sulfur | 0.2 |

The hardness of the cured product was 20 on a Shore A durometer.

EXAMPLE 9

The procedure of Example 8 was followed except that a sulfide of rank 1.60 was used. The Brookfield viscosity of the product was 40.8 poises at 80° F. The Shore A durometer hardness of the product when cured according to the procedure of Example 8 was 15.

EXAMPLE 10

The procedure of Example 8 was followed except that a sulfide of rank 1.80 was used. The viscosity of the product was 72 poises and its cured hardness was 8.

EXAMPLE 11

The procedure of Example 8 was followed except that a sulfide of rank 2.0 was used. The viscosity of the product was 98.3 poises. The cured product was too soft to permit measurement of its hardness on the durometer, although a small degree of cure was evident.

It is of course to be understood that the foregoing examples are illustrative only and that numerous changes can be made in the ingredients, proportions and conditions set forth therein without departing from the spirit of the invention as set forth in the appended claims.

We claim:

1. The method of making a polymercaptopolysulfide polymer which comprises reacting at least one aqueous thiosulfate of the formula $R(SSO_3Na)_n$ wherein R is selected from the group consisting of aliphatic hydrocarbon and oxahydrocarbon groups and $n$ has a value of 2–4, with a mixture of alkaline sulfide and hydrosulfide containing from 0.05 to 2.0 mols of hydrosulfide per mol of sulfide, the relative amounts of thiosulfate and alkaline sulfide being such that from 1 to 2 molecules of alkaline sulfide react with each two molecules of thiosulfate to cause a liquid polythiopolymercaptan having a molecular weight of 1000 to 50,000 to separate as a continuous non-aqueous phase.

2. The method of making a polymercaptopolysulfide polymer which comprises reacting at least one aqueous thiosulfate of the formula $R(SSO_3Na)_n$ wherein R is selected from the group consisting of aliphatic hydrocarbon and oxahydrocarbon groups and $n$ has a value of 2–4, with a mixture of alkaline sulfide and hydrosulfide containing from 0.002 to 2.0 mols of hydrosulfide per mol of sulfide, the relative amounts of thiosulfate and alkaline sulfide being such that from 1 to 2 molecules of alkaline sulfide react with each two molecules of thiosulfate to cause a polymer to separate as a non-aqueous phase, said polymer responding to the general formula $(H)_{2+(m-2)y}(SR'S)_z(R''S_m)_y$ wherein $m$ has a value from 2–4, $y$ has a value from 0–10, $z$ has a value from 2–500 and R' and R" are selected from the group consisting of aliphatic hydrocarbon and oxahydrocarbon radicals, R' having two sulfur-connected valences and R" having $m$ sulfur-connected valences.

3. A method of making a polythiopolymercaptan which comprises reacting an aqueous mixture of polythiosulfates selected from the group consisting of aliphatic hydrocarbon and oxahydrocarbon thiosulfates and containing from 90–99 mol percent of dithiosulfates and 1–10 mol percent of thiosulfates containing more than two thiosulfate groups, with a mixture of alkaline sulfide and hydrosulfide containing from 0.002 to 2.0 mols of hydrosulfide per mol of sulfide, the relative amounts of thiosulfate and alkaline sulfide being such that from 1 to 2 molecules of alkaline sulfide react with each two molecules of thiosulfate to cause a cross-linked polythiopolymercaptan to separate as a non-aqueous phase.

4. The method of making a polythio-polymercaptan which comprises reacting an aqueous oxahydrocarbon polythiosulfate with a mixture of alkaline sulfide and hydrosulfide containing from 0.002 to 2.0 mols of hydrosulfide per mol of sulfide, the relative amounts of polythiosulfate and alkaline sulfide being such that from 1 to 2 molecules of alkaline sulfide react with each two molecules of polythiosulfate to cause an oxahydrocarbon polythiopolymercaptan to separate as a non-aqueous phase.

5. A method according to claim 4 and wherein said polythiosulfate is a dithiosulfate.

6. A method according to claim 5 and wherein said dithiosulfate is a beta, beta-dithiosulfate of diethyl ether.

7. A method according to claim 5 and wherein said dithiosulfate is a beta, beta-dithiosulfate of diethyl formal.

8. A method according to claim 5 and wherein said dithiosulfate is a delta, delta-dithiosulfate of dibutyl formal.

9. A method according to claim 5 and wherein said alkaline sulfide and hydrosulfide are sodium monosulfide and sodium hydrosulfide.

10. The method of making a liquid polythio-polymercaptan which comprises reacting at least one aqueous thiosulfate of the formula $R(SSO_3Na)_n$ wherein R is selected from the group consisting of aliphatic hydrocarbon and oxahydrocarbon groups and $n$ has a value of 2–4, with a mixture of alkaline sulfide and hydrosulfide containing from 0.05 to 2.0 mols of hydrosulfide per mol of sulfide, the relative amounts of thiosulfate and alkaline sulfide being such that from 1 to 2 molecules of alkaline sulfide react with two molecules of said thiosulfate to cause a polymer to separate as a non-aqueous phase, said polymer responding to the general formula $(H)_{2+(m-2)y}(SR'S)_z(R''S_m)_y$ wherein $m$ has a value from 2–4, $y$ has a value from 0–10, $z$ has a value from 2–40 and R' and R'' are selected from the group consisting of aliphatic hydrocarbon and oxahydrocarbon radicals, R' having two sulfur-connected valences, and R'' having $m$ sulfur-connected valences.

11. A method of making a polythio-polymercaptan which comprises reacting an aqueous mixture of polythiosulfate selected from the group consisting of aliphatic hydrocarbon and oxahydrocarbon thiosulfates and containing from 90–99 mol percent of dithiosulfates and 1–10 mol percent of thiosulfates containing more than two thiosulfate groups, with a mixture of alkaline monosulfide and hydrosulfide containing from 0.05 to 2.0 mols of hydrosulfide per mol of sulfide, the relative amounts of said polythiosulfate and alkaline monosulfide being such that from 1 to 2 molecules of alkaline monosulfide react with 2 molecules of said polythiosulfate to cause a cross-linked liquid polythio-polymercaptan to separate as a continuous non-aqueous phase.

12. The method of making a liquid polythio-polymercaptan which comprises reacting an aqueous oxahydrocarbon polythiosulfate with a mixture of alkaline monosulfide and hydrosulfide containing from 0.05 to 2.0 mols of hydrosulfide per mol of sulfide, the relative amounts of said polythiosulfate and alkaline monosulfide being such that from 1 to 2 molecules of alkaline monosulfide react with 2 molecules of said polythiosulfate to cause a liquid polythio-polymercaptan to separate as a continuous non-aqueous phase.

13. The method of making a polymercapto polysulfide polymer which comprises reacting an aqueous solution of an organic polythiosulfate with an aqueous mixture of hydrosulfide and sulfide containing from 0.002 to 2.0 mols of hydrosulfide per mol of sulfide, the relative amounts of said polythiosulfate and sulfide being such that from 1 to 2 molecules of said sulfide react with 2 molecules of said polythiosulfate to cause a polythiopolymercaptan to separate as a non-aqueous phase.

References Cited in the file of this patent
UNITED STATES PATENTS

| | | |
|---|---|---|
| 2,363,614 | Patrick | Nov. 28, 1944 |
| 2,402,977 | Patrick et al. | July 2, 1946 |